MANUFACTURE OF CERAMIC OBJECTS AND THE LIKE

Original Filed April 13, 1964

INVENTOR
ELDON D. MILLER, JR.
BY William C. Nealon
ATTORNEY

MANUFACTURE OF CERAMIC OBJECTS AND THE LIKE

INVENTOR.
ELDON D. MILLER, JR.
BY William C. Nealon
ATTORNEY

MANUFACTURE OF CERAMIC OBJECTS AND THE LIKE

Original Filed April 13, 1964 3 Sheets-Sheet 3

INVENTOR.
ELDON D. MILLER, JR.
BY William C. Nealon
ATTORNEY 3,304,046
Patented Feb. 14, 1967

3,304,046

MANUFACTURE OF CERAMIC OBJECTS AND THE LIKE

Eldon D. Miller, Jr., Bridgeville, Pa., assignor to Harbison-Walker Refractories Company, Pittsburgh, Pa., a corporation of Pennsylvania Original application Apr. 13, 1964, Ser. No. 359,145, now Patent No. 3,290,421, dated Dec. 6, 1966. Divided and this application May 31, 1966, Ser. No. 566,454
6 Claims. (Cl. 249—142)

This application is a division of application Serial No. 359,145, filed April 13, 1964, entitled, "Manufacture of Ceramic Objects and the Like," now Patent No. 3,290,421.

This invention relates to manufacture of ceramic objects, including objects made of refractory materials. The invention also relates to mold manufacture. In one aspect, it relates to the manufacture of moisture-absorbent multi-component molds of the type used to cast ceramic and refractory materials. It, still further, relates to improved multi-component molds, the several parts of which are capable of accurate and rapid assembly and which, subsequently, can be disassembled easily.

There are several known processes for the forming of ceramic and refractory shapes or objects, and they probably can be classified most easily according to the nature or state of the ceramic or refractory material which is used. The three classes which I would suggest are:

(I) slip processes, (II) plastic processes, and (III) dry press methods such as, for example, forming on a mechanical brick press, a runner brick press, an impact press, etc.

The present invention is applicable only to Groups I and II, and has no relation to Group III.

The so-called slip processes use relatively finely divided argillaceous materials and the like in an aqueous suspension or emulsion, with or without the addition of powdered frits, fluxing ingredients such as feldspar, and the like. The suspension is quite fluid. I know of the use of organic fluids such as alcohols, esters and ketones, in place of the water, as the carrier medium for the finely divided materials which are used in slip processes. The slip is poured into a porous mold, usually of gypsum plaster or a similar moisture-absorbent substance, which mold takes up the water or fluid from the slip to produce a self-sustaining green object of the desired shape.

The so-called plastic processes are really quite similar to the slip processes, the primary differences residing in sizing of the ingredients and the quantity of tempering agent or carrier liquid which is mixed with the solids. For example, the materials used in the slip processes are probably all −325 mesh; and certainly no particles are larger than 100 mesh. The solids-liquid weight ratio is probably on the order of about 1 to 1. In contrast the so-called plastic processes can use very coarse material. For example, 40 or 50% of the solids can be −3+28 mesh. I have successfully used even coarser particles; for example, on the order of ¼″, as about 5 or 10% of the total solids. The tempering fluid or carrier agent is usually water mixed with a dispersing agent; for example, sodium pyrophosphate. The tempering fluid is present in an amount in the range 5 to 10%, based on the weight of the solids. When this solids-liquid mixture is cast into moisture-absorbent molds, there is usually jiggering and tamping or vibration to consolidate the cast material and remove entrapped air. These plastic mixes, while I am not sure they can be correctly termed "thixotropic," do exhibit many properties one would expect to be associated with such a material.

Molds, which are used in both the slip and plastic processes, can be any of a wide variety of shapes, sizes, configurations, and also can be composed of varying numbers of components. My invention has particular applicability to the so-called plastic processes and molds of the multicomponent type. As will be developed hereafter, its many benefits can also be enjoyed in the so-called slip processes.

When the object to be cast by the slip or plastic process is of relatively simple shape, such as, generally cubic, ovoid, hemispherical, etc., the molds are quite simple. When these simple shapes are to include a single internal aperture or cavity, mold preparation is still easy. I am here referring to such cavities as one might expect in a cup or vase, refractory nozzle, etc. More serious problems arise, however, when one wishes to fabricate a ceramic or refractory piece which is to have a plurality of internal passages or cavities, etc., which are separated from each other by relatively thin walls. It is even more difficult when these internal cavities or passages are required to have a precise, accurate relation to each other. For example, assume one wishes to cast a honeycomb-like structure having a plurality of uniformly dimensioned passages therethrough, which passages are of regular, but noncircular, cross section; for example, triangular, square, hexagonal, etc., and in which certain surfaces or walls of respective passages must be accurately positioned relative to each other. For example, consider a group of passages each of which forms a hexagon, and that each hexagonal passage is required to have its flat walls almost perfectly parallel with the wall surfaces of all adjacent passages. When such specifications are to be met in the casting of a refractory or ceramic shape, mold manufacture is replete with problems. The mold has a plurality of mold components, which have to be accurately positioned relative to each other before casting can take place. These plural components must be substantially immovable during the casting operation to obtain the required alignment of adjacent walls in a resulting cast shape. Using prior techniques of mold construction, one would make a series of hexagon-shaped moisture-absorbent mold pieces, each one having a metal rod extending from the bottom probably exteriorly threaded, which threaded end would be fastened in a complementarily threaded aperture in another mold piece to align it and hold it in place. Sometimes the threaded rod passes completely through another one of the components to be fastened in place by a wing nut or the like. However, these methods of threading and, otherwise, mechanically fastening the pieces are extremely burdensome and time consuming; since, as each one is put in place, one must be careful not to disturb it or cause it to rotate slightly, as each one subsequently placed of the components is hand aligned with previously positioned ones. This system of assembly requires use of measuring tools or devices, such as, calipers, rulers and the like. Still further, since vibration is usually necessary when casting plastic mixes, the mechanical fasteners loosen and allow mold parts to wobble out of place.

Accordingly, it is a primary object of this invention to provide a moisture-absorbent multi-component mold of the type used to cast ceramic and refractory materials.

Briefly, according to one aspect of the invention, I provide for the manufacture of multi-component molds.

A plurality of flexible anchor elements are made of a rubber or rubber-like material. These anchor elements include a polarized aperture or passage. They further include an external surface configuration arranged to cooperate with the material from which the moisture-absorbent mold components are themselves made to anchor these elements in place. A plurality of these flexible anchor elements are attached in an accurate pattern to one or more of the master patterns in predetermined positions.

These positions determine the later assembly of at least some other of the moisture-absorbent mold components. The material of which the mold components are to be made is cast over the master patterns in the usual manner, and in such a way as to firmly anchor the flexible anchor elements within the bodies of at least some of the moisture-absorbent mold components. However, they are so incorporated in respective moisture-absorbent mold components as to expose and allow easy access to the polarizing apertures, above noted. In my preferred embodiment, this polarizing aperture is a hexagonal passage. The hexagonal passages through the plurality of anchor elements are, of course, related to each other in a predetermined manner; since it is these passages which, in large part, later firmly fix and hold some of the moisture-absorbent mold components in desired position and relationship to each other. Those moisture-absorbent mold components, which must be accurately positioned, include a pin of hexagonal shape arranged to be inserted in selected ones of the flexible anchor elements. I suggest brass pins. These pins are of slightly larger cross section than the polarizing apertures in which they are to be inserted. Since the anchor elements are flexible, they give somewhat when the pins are inserted to frictionally hold them, and the mold components of which the pins are a part, in place. Still further, because of the flexible character of the anchor elements, the pins are removed easily after a ceramic or refractory shape has been cast. Even more useful is that vibration of an assembled mold does not loosen or move the mandrels.

Other objects and further features and advantages of mold construction, and resulting molds, according to the teachings of this invention, will become readily apparent to those skilled in the refractory and ceramic arts from a study of the following detailed description, together with reference to the appended exemplary drawings. In order to facilitate explanation, I have selected an exemplary complicated shape which can be cast in a mold constructed according to the invention. Other shapes and arrangements, of course, lend themselves to manufacture according to the concepts set forth herein. Therefore:

In FIG. 1 there is shown a perspective view of a complicated ceramic piece having a plurality of accurately aligned passages formed therethrough, which passages are of hexagonal, cross-sectional configuration, and which piece is made in molds fabricated according to this invention;

In FIG. 2 there is shown a perspective view of a mold fabricated according to the concepts of this invention, which can be used to cast the piece of FIG. 1;

Figure 1:
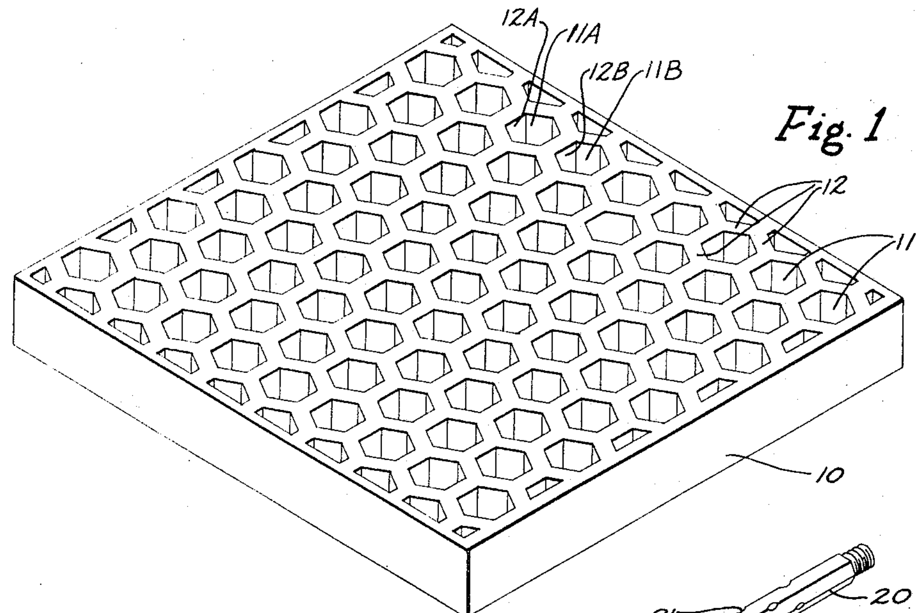

I show, in FIG. 1, a shape or plate which is usable, for example, as a fluid bed support. It is designed to allow maximum fluid flow. To properly control fluid flow, it is required that the apertures or passages which are formed by the honeycomb network of refractory or ceramic which constitutes the shapes, be accurately aligned in a predetermined pattern. It should be understood this environment of use and the shape, itself, are strictly for the purposes of explanation in this case; and are indicative only of the type of casting problem which can be solved by the invention. The shape 10 is generally rectangular in horizontal cross section, is relatively thin as compared to width, and has a plurality of regular hexagonal passages 11 formed through it. These passages are defined by the interconnected honeycomb network of refractory webs 12. The webs 12 are quite thin, at least as compared to the thickness of the shape. The hexagonal passages are so arranged as to provide maximum open space through the plate 10, commensurate with structural integrity and strength for subsequent use. All adjacent faces or walls which form adjacent passages are parallel. Consider, for example, the passages 11A and 11B. Faces 12A and 12B are substantially parallel, as are respective immediately opposed faces in a common passage.

Figure 2:
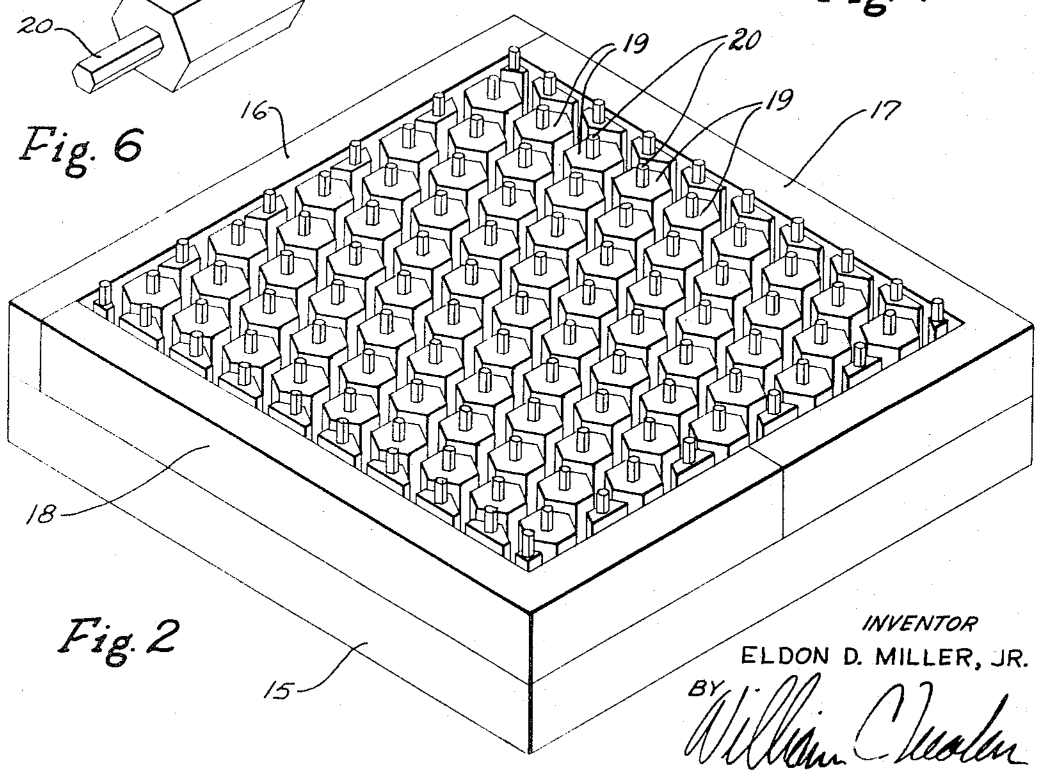

The shape of FIG. 1 is made in the mold assembly of FIG. 2. The mold assembly is comprised of a plurality of moisture-absorbent mold components, including the base plate 15, the back plate 16 and the two mirror-image side forms 17 and 18. A plurality of moisture-absorbent mandrels 19 (these mandrels are, themselves, "mold components") are accurately positioned within the upwardly opening void formed by the assembled base plate, back plate and side forms.

Figure 6:
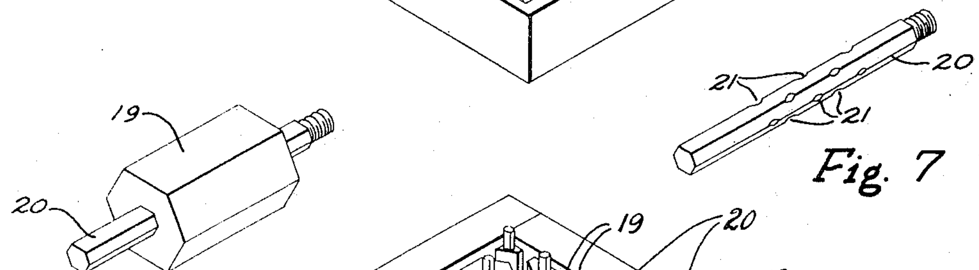
FIG. 6 is a perspective view of one of the moisture-absorbent mandrels shown in FIG. 4.
Figure 7:
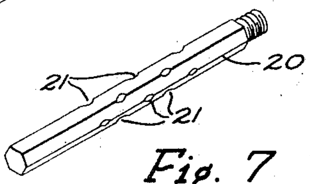
FIG. 7 is a perspective view of one of the pins upon which the mandrels of FIG. 6 are mounted.

Each of the mandrels 19 includes a pin or stem 20. Referring for the moment to FIGS. 6 and 7, the mandrels 19 are hexagonal in shape, and are of such dimensions as to form the passages 11 of the shape of FIG. 1. They have a slight downward taper from one end to the other; for example, from the top of FIG. 6 to the bottom thereof, to facilitate removal from a cast shape. By slight taper, I mean, for example, considering a mandrel about 2½" in vertical extent, the downward taper is about $\frac{1}{32}$" per foot. However, as one can see, opposed walls or faces in an aperture or passage made by the mandrel 19 are substantially parallel. The cross section of pins 20 is hexagonal or noncircular. This is to polarize them to hold the mandrels in place. The pin cross sectional configuration, of course, could be square, triangular, oval, etc. At a position intermediate its longitudinal extent, each pin 20 has a few grooves or notches 21 formed. Only sufficient notches 21 are formed, as can be encompassed within the body of the mandrel 19; and their only purpose is to firmly anchor a pin 20 within the body of mandrel 19. They could be glued or one could depend on frictional engagement to hold the pin and mandrel together, but I prefer to notch the pins. Still further, the pin and mandrel could be cast as one piece when the mold material is of sufficient strength. In any event, the pin or equivalent must extend outwardly from the top and the bottom faces of the mandrel. One extending end mates with a polarizing anchor element, such as the one shown in FIG. 5, which will be discussed later, and the other end is to allow manual removal and insertion of the mandrel pin assembly as required.

Figure 4:
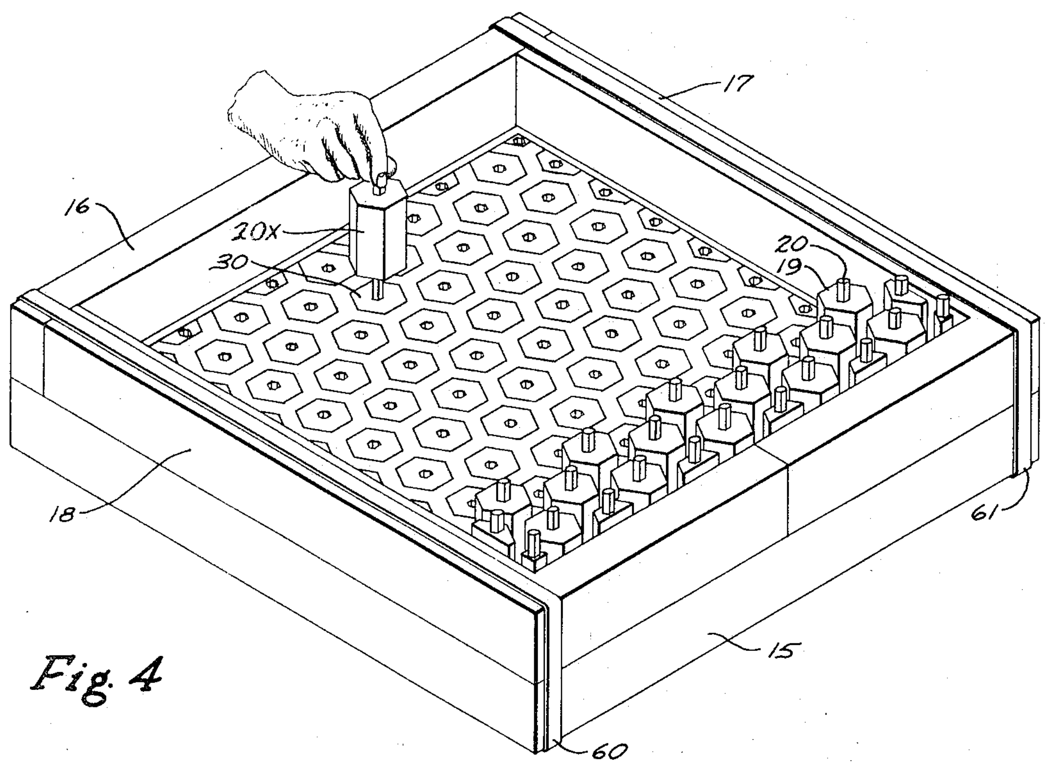
FIG. 4 is a perspective view of the mold elements of FIG. 3 as they are assembled, and indicating placement of internal mandrels to form the passages in the cast shape of FIG. 1.

In FIG. 4, I have shown the mold of FIG. 2 at an intermediate stage of its assembly. A group of mandrels and pins have been assembled, and a worker is shown inserting an additional one 20X in one of the resilient anchoring devices 30. The anchoring device 30, as perhaps shown more clearly in FIG. 5—which shows a master pattern used to manufacture the base plate 15, has an irregular external surface configuration, to assure firm and immovable anchoring in the body of the base plate 15. I have shown an anchor element which is hexagonal in cross section and having a circumferential depression 31 formed intermediate its ends. The anchoring element, further, has an internal polarizing aperture or passage 32, which is arranged to receive, align and releasably grip an extending end of one of the pins 20.

The cross section of a passage 32 is, preferably, slightly smaller than the cross section of the extending end of a pin 20. For example, a ⅜" diameter mandrel pin 20 is inserted in a passage or aperture 32 on the order of $\frac{5}{16}$" in diameter.

Anchor elements 30 are flexible. They are cast or fabricated of a flexible rubber or rubber-like material of sufficient elasticity to "give" slightly when a pin 20 is inserted in a passage 32. Still further, when a pin 20 is inserted, some of the anchor element substance is displaced upwardly a slight distance above the flat upper surface of the base plate. The bottom of mandrel 19 is thus supported slightly out of contact with the base plate and overcomes the possibility of chipping edges thereof as might occur if placed directly against the base plate. Its rubber-like character also serves to frictionally engage a pin 20, which frictional engagement is easily overcome when one wishes to lift the mandrel upwardly from a cast shape.

Figure 3:
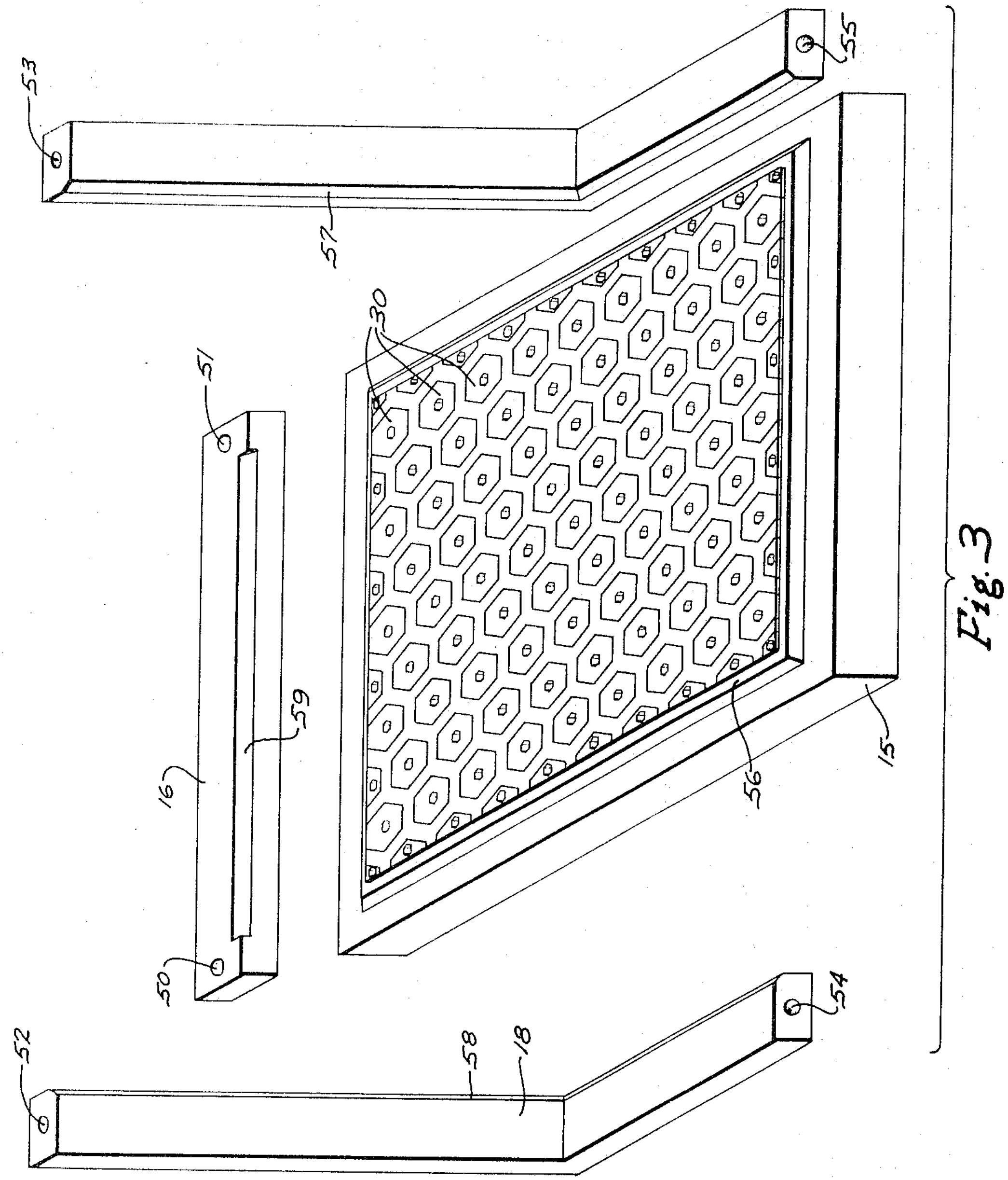
FIG. 3 is a perspective view of some of the components used to assemble the mold of FIG. 2.
Figure 5:
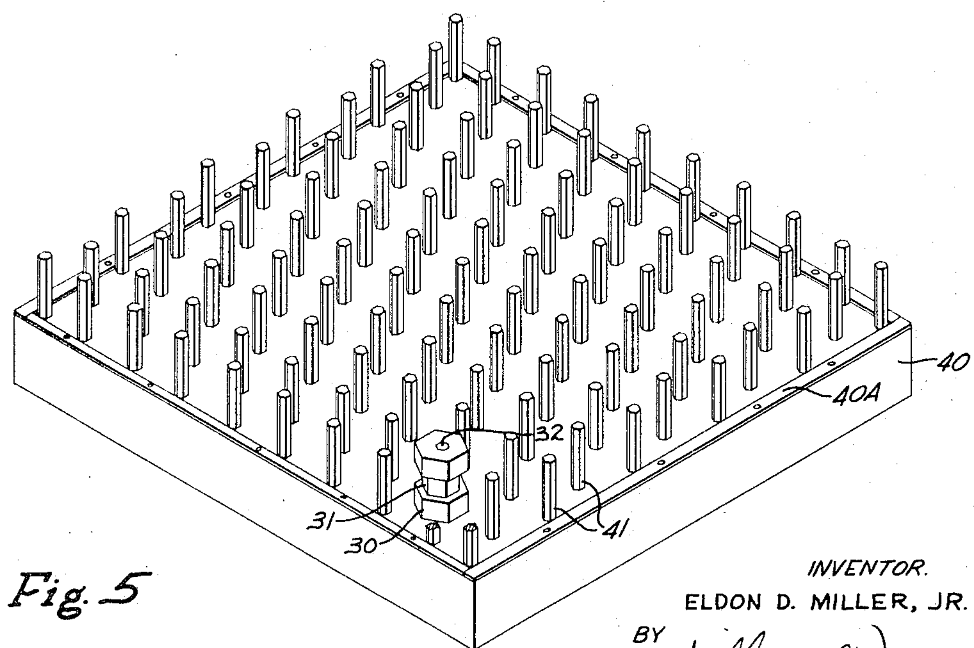
FIG. 5 is a perspective view of a master pattern, usable to make an element of FIGS. 2 through 4, in an initial stage of assembly.

The bottom plate master pattern 40 of FIG. 5 conventionally is fabricated of wood. A plurality of apertures has been formed through its upper surface to receive the plurality of pins 41. The pins 41 are of substantially the same cross sectional configuration as the pins 20. The pins 41 are placed in holes or apertures which are carefully machined in an accurately determined spatial arrangement. Their respective vertical center lines will correspond to center lines of the passages 11 in the final shape 10 of FIG. 1. In practice, the apertures in pattern 40, into which the pins 41 are inserted, are slightly smaller in cross section to allow a firm, drive fit. Thus, in making the pattern of FIG. 5, the pins 41 are driven into the accurately aligned holes or apertures formed for that purpose, and the plurality of the anchoring elements 30 are slipped into position over these pins 41. They are pressed down firmly so their lower surfaces are contiguous to and, preferably, in contact with, the upper face or surface of the pattern 40. Wooden side patterns (not shown) are releasably affixed about the edges or sides of the pattern 40, to provide a cavity capable of retaining the material from which the moisture-absorbent base plate is to be made. I have not shown the side forms in the drawings, since they are merely flat boards so one can make an open-topped box-like affair, which will hold the cast mold material (for example, gypsum plaster), to a depth equal to the vertical extent of the anchor elements 30, until that material sets. The next step is to pour prepared plaster slurry or the like over the anchor elements 30. When a good firm set is obtained in the mold material (this is, of course, variable, but we suggest waiting about an hour when one uses conventional gypsum plaster), the set, moisture-absorbent base plate is removed from the master pattern. This is easily done by taking off the side forms, gripping the solid plaster piece, and lifting. The anchor elements are permanently positioned within the body of the resulting base plate 15, with their upper surfaces exposed substantially as shown in FIG. 3. The side forms 17 and 18 and the back plate 16 are made in a similar manner, i.e. plaster slurry is poured into a prepared master pattern, the slurry is allowed to set, and the finished shapes 16, 17 and 18 are recovered. As is also conventional, suitable keying structure is formed in the plates. For example, protuberances 50 and 51 are formed in opposed ends of the plate 16, in such a position as to mate with the complementary depressions 52 and 53 of the side forms 17 and 18. Respective opposite end surfaces of these side forms have a depression 54 and protuberance 55 to mate those respective surfaces. The ridge 56 on the upper surface of base plate 15 was formed by the wood strip 40A on the master pattern of FIG. 5. Complementary grooves 56 and 57 are formed in the side pieces 17 and 18.

After assembly of the mold parts 15, 16, 17 and 18, they are held together in a conventional manner, as by rubber bands 60 and 61.

While I have shown protuberances or extending pieces for the mandrel assemblies, such as extending ends of the pins 20, and complementary apertures in the anchoring elements 30, it is, of course, understood that the arrangement can be reversed, i.e. instead of apertures in the elements 30, there could be pins or integral protuberances arranged to seat in complementary keying structure on one end of the mandrel body 19. In any event, however, the protruding portion of the keying system for the mandrels and anchoring elements is of hard and not flexible materail such as metal or ceramic; and the complementary aperture is of a flexible material.

The novel arrangement of keying elements, in a multi-component mold made according to the concepts of this invention, allows rapid but very accurate assembly of the plural mold parts. An even more beneficial aspect of the arrangement, however, is the speed with which the elements may be disassembled; in particular, the speed with which the passage-forming mandrels can be removed. Well known to those in the art, in casting ceramic and refractory ware of such complex shapes as shown in FIG. 1, a very limited time period exists between initial set of the cast body and the time at which the cast body shrinks onto internal molds or mold parts. With prior arrangements where wing nuts, threaded apertures and bolts, etc., were used to lock mandrels in position, one experienced considerable difficulty in disconnecting and removing all of the internal parts before ware shrinkage fixed the cast part to the internal parts and caused ware cracking and breakage. When this occurred, the cast piece was a loss. Even more distressing, was the loss of labor required in laboriously assembling the mold components, preparation and casting of the slip or plastic mass, set time, etc.

In the interest of a complete disclosure, Table I sets forth a gypsum plaster chemical analysis (by weight, and on an oxide basis) which plaster is satisfactory for making mold components.

*TABLE I*

| | |
|---|---|
| Silica ($SiO_2$) | 0.3 |
| Alumina ($Al_2O_3$), Titania ($TiO_2$), Iron oxide ($Fe_2O_3$) | 0.2 |
| Lime (CaO) | 38.4 |
| Magnesia (MgO) | 0.4 |
| Sulfur ($SO_3$) | 53.8 |
| Ignition loss | 6.6 |

The gypsum solids are mixed with water in such a ratio as to provide 100 parts of plaster for each 60 parts of water, by weight.

I have mentioned brass for the pins 20 and 41. Other materials, of course, can be used; for example, aluminum, steel, etc. A suitable refractory mixture, which I have successfully cast in molds made according to the method above, is that described and claimed in my recent United States Patent No. 3,121,640, issued February 18, 1964, and entitled "Alumina Refractories."

In the discussion, above, I have stressed the importance of accurate alignment of anchor elements, mandrels, and pins. To obtain the required degree of accuracy, I align corresponding hexagon flat surfaces. For example, when I have positioned a series or line of the mandrel assemblies, pins 41, or the anchor elements, I use a steel straight edge to be sure all corresponding hexagon flats are straight.

Disassembly of the base plate 16 from the master pattern 40 is facilitated if one uses a lubricant for the pins 41 on which the anchor elements 30 are placed; for example, a silicone stop-cock grease. A particularly satisfactory material for the manufacture of the elements 30 is a commercially available rubber molding compound sold under the tradename "Gra-Tufy."

Having thus described the invention in detail and with sufficient particularity as to enable those skilled in the art to practice it, what is desired to have protected by letters patent is set forth in the following claims:

I claim:

1. In a moisture-absorbent multi-component mold suitable for casting complex ceramic and refractory materials consisting of a base having an upper surface and sidewalls releasably affixed thereto to provide a cavity, a plurality of undirectional, noncircular mold components extending vertically from the upper surface of the base within the cavity in an accurate pattern, each of said mold components being frictionally engaged with and removably secured to the base by means of complementary polarizing keying means attached to the base and mold components, one of said keying means being flexible and the other rigid.

2. In a moisture-absorbent mold suitable for casting ceramic and refractory materials consisting of a base having an upper surface and sidewalls releasably affixed to the upper surface of the base to provide a cavity, a plurality of accurately spaced polarizing apertures in said base within the cavity and a plurality of mold components cooperating with said apertures and extending vertically therefrom, said mold components consisting of anchor elements containing polarizing keying means and mandrels containing complementary keying means, each of said anchor elements being mated with and releasably keyed to a mandrel, one of said keying means in each mated pair being flexible, each anchor element being permanently positioned in an aperture in the base to polarize said pair, the vertical extent of the mandrels being at least equal to that of the sidewalls.

3. A moisture-absorbent multi-component mold suitable for casting ceramic and refractory materials consisting of a base having an upper surface and containing a plurality of spaced polarizing apertures, a plurality of anchor elements, each being disposed in an aperture, and containing keying means for polarizing a mandrel, a plurality of mandrels each having an upper and lower end, each mandrel being disposed at the lower end thereof in contiguous contact with an anchor element at the upper surface of the base, said mandrels having complementary keying means on their lower ends which are removably mated with the keying means of the anchor elements, one of said keying means being flexible and the other rigid, said mandrels also containing a protuberance extending from the upper end thereof for manual manpulation thereof, and sidewalls releasably affixed to the base to provide a cavity and being of a vertical extent substantially equal to that of the mandrels.

4. A moisture-absorbent multi-component mold suitable for casting ceramic and refractory materials consisting of a base having an upper surface and a plurality of polarizing apertures in an accurate predetermined pattern, a plurality of flexible anchor elements, each being permanently positioned in an aperture and containing an accessible internal polarized passage, a plurality of mandrels with opposed ends, each end having a protuberance extending therefrom, said mandrels having an end disposed on and in contiguous contact with an anchor element, one of said protuberances on each mandrel being removably secured in the passage of a said anchor element, and sidewalls releasably affixed to the base to provide a cavity and being of a vertical extent substantially equal to that of the mandrels.

5. A multi-component mold for casting ceramic and refractory materials consisting of a moisture-absorbent base having an upper surface and containing a plurality of hexagonal shaped apertures in an accurate spaced relation, a plurality of flexible anchor elements permanently positioned in said apertures, each element having an accessible hexagonal passage therethrough, a plurality of moisture-absorbent mandrels with opposed ends, containing a rigid pin passing therethrough and extending from both ends, in contiguous contact at one end thereof with the elements at the upper surface of the base, said extending pin at that end being removably secured in a passage, and moisture absorbent sidewalls releasably affixed to the base to provide a cavity and being of a vertical extent substantially equal to that of the mandrels.

6. In a moisture-absorbent mold suitable for casting ceramic and refractory materials consisting of a base having an upper surface and sidewalls releasably affixed to the upper surface of the base to provide a cavity, a plurality of accurately spaced polarizing apertures in said base within the cavity and a plurality of mold components cooperating with said apertures and extending vertically therefrom, said mold components consisting of anchor elements containing polarizing keying means and mandrels containing complementary keying means, each of said anchor elements being mated with and releasably keyed to a mandrel, one of said keying means in each mated pair being flexible, each anchor element being permanently positioned in an aperture in the base to polarize said pair.

No references cited.

J. SPENCER OVERHOLSER, *Primary Examiner.*

J. HOWARD FLINT, Jr., *Examiner.*